United States Patent
Gordon et al.

[15] 3,667,030
[45] May 30, 1972

[54] AC-TO-AC POWER REGULATION CIRCUITS HAVING LOW E.M.I. AND SHORTED LOAD PROTECTION

[72] Inventors: David R. Gordon, Des Moines; Gary L. Tarbox, Seattle, both of Wash.

[73] Assignee: Pacific Electro Dynamics, Inc., Bellevue, Wash.

[22] Filed: Feb. 26, 1970

[21] Appl. No.: 14,511

[52] U.S. Cl. ...................................323/24, 307/133, 323/22 T, 323/34
[51] Int. Cl. ............................................................G05f 5/00
[58] Field of Search ...................323/22 SC, 22 T, 23, 24, 34, 323/4, 9, 16–22, 22 ZS; 321/18; 307/133

[56] References Cited

UNITED STATES PATENTS

| | | | |
|---|---|---|---|
| 3,068,392 | 12/1962 | Santelmann, Jr. | 321/18 |
| 3,335,360 | 8/1967 | Reinert | 323/22 ZS |
| 3,363,143 | 1/1968 | Cavanaugh | 323/22 X |
| 3,493,838 | 2/1970 | Gyugyi et al. | 323/22 T X |

*Primary Examiner*—Gerald Goldberg
*Attorney*—Graybeal, Cole & Barnard

[57] ABSTRACT

AC-to-AC power regulation circuits with power switch means in series with the line and load, the conduction period or angle of the power switch means being controlled to regulate the power output. Transistor type power switch means is turned on at zero current phase and turned off at the end of the desired conduction period. Capacitative line filtering is employed to minimize electromagnetic interference (e.m.i.), with marked weight reduction as compared with conventionally used inductive line filtering, rendering the circuits especially advantageous for aircraft use, such as for lamp dimmers, windshield temperature controllers, and aircraft AC power supplies in general. Bi-directional transistor type power switch means in circuits of the present invention, with proper bias, are inherently current-limiting and therefore can be operated into a short circuit load without damage to the power regulation circuit. Such power switch means, as contemplated by the invention, are power transistors, in contrast to conventionally used silicon controlled rectifiers (SCRs).

8 Claims, 4 Drawing Figures

INVENTORS,
DAVID R. GORDON
GARY L. TARBOX

BY Graybeal, Cole & Barnard
ATTORNEYS

AC-TO-AC POWER REGULATION CIRCUITS HAVING LOW E.M.I. AND SHORTED LOAD PROTECTION

BACKGROUND OF THE INVENTION

1. Field of the Invention

The invention pertains generally to alternating current power regulation circuitry, particularly to AC-to-AC power regulation circuits involving power switch means in series with the line and load with the alternating current applied bi-directionally to the switch means and with the switch means turned on at zero current phase and turned off at the end of the desired conduction period each half-cycle. Capacitative line filtering is used to minimize rate of change of current in the load and thus minimize electromagnetic interference (e.m.i.), the use of capacitative filtering enabling marked weight reduction, rendering the circuits especially advantageous for aircraft use such as in lamp dimmers, windshield temperature controllers, and AC power supplies for general aircraft application.

2. Description of the Prior Art

The conventional technique for AC-to-AC power regulation involves silicon controlled rectifier means (SCRs) in series with the line and load, with SCR turn-on at a variable time after zero current phase each half-cycle, with the turned-on SCR remaining in a conductive condition throughout the rest of the half-cycle. Typical disclosures of this type of circuit are found in Yancey U.S. Pat. No. 3,335,318, Schultz et al. U.S. Pat. No. 3,419,753, and Misencik et al. U.S. Pat. No. 3,434,039. This type of circuit characteristically involves high peak currents because of an inherently high rate of change of current ($di/dt$) at the instant of SCR turn-on. Since the SCR normally works against the impedance of the line (which can be on the order of tenths of an ohm), the high peak currents necessitate use of relatively heavy inductor type filtering means (as at choke 53 in U.S. Pat. No. 3,335,318, inductor 15 in U.S. Pat. No. 3,419,753 and inductance 24 in U.S. Pat. No. 3,434,039). Such inductive line filters of necessity can weigh as much as several pounds in aircraft light dimmer or window temperature controller by regulation circuits, for example, and represent a quite undesirable weight requirement. A further disadvantage of power regulation circuits involving SCRs for controlling the line conduction period is that should a short occur in the load the increased current flow through the SCRs often results in destruction or damage to the SCRs unless special current-loading circuitry is included.

The inherent e.m.i. problems resulting from delayed (after zero) turn-on of SCRs for variable power regulation have led to development of circuits such as found in Johnson U.S. Pat. No. 3,365,654 and Funfstuck U.S. Pat. No. 3,391,332, wherein the power controlling SCR is turned on at zero current phase and conducts through the entire half-cycle, with the variation in power output being accomplished by variation as to the relative number of half-cycles during which the SCR is turned on or not turned on. This technique, although somewhat reducing the line filtering requirement, inherently results in load current surging which cannot be tolerated in many applications.

Further examples of circuits involving SCR type power regulation control devices are found in Biet et al. U.S. Pat. No. 3,333,182 and Davis U.S. Pat. No. 3,388,294. These circuits involve so-called triacs, which are basically two SCRs in anti-parallel. In this type of circuit triggering of the triac is by a differentiating transformer or by a saturable reactor. Since turn-on of the semiconductor devices is after zero current phase, this manner of power regulation suffers the same e.m.i. generation difficulties and weight problems as characterized the SCR type power regulation circuits first discussed.

Another type of application of SCRs for power regulation is in so-called "soft start" circuits, such as shown by Cavanaugh U.S. Pat. No. 3,363,143 and French U.S. Pat. No. 3,391,331. In this type of circuit the relatively high initial current surge called for by a cold, relatively low impedance load (incandescent lamps in U.S. Pat. No. 3,363,143 and coil springs being stress relieved in U.S. Pat. No. 3,391,331) is compensated for by controlling in-line SCRs to deliver initially less power to the load during a start-up period, the mode of load current control being best shown in U.S. Pat. No. 3,363,143 at the load current waveform FIG. 3e, with the SCR control being in the characteristic manner of turn-on after zero current phase each half-cycle and with conduction continuing until occurrence of the reverse bias necessary to cut off the SCR. It is also notable in the FIG. 3e waveform of U.S. Pat. No. 3,363,143 that, after the "soft start" operational mode, the "normal" operational mode involves SCR conduction substantially throughout each half-cycle, i.e., there is no power regulation as such after the "soft start" interim. The modified form of circuit shown in FIG. 5 of U.S. Pat. No. 3,363,143 presents a circuit wherein a transistor and associated bi-directional bridge circuit replaces the SCRs in the load line. While this modified form of circuitry is presented on the basis that the power transistor and associated diode bridge may be used in place of the SCRs, it is to be noted that in context the power transistor in this circuit is controlled in the same manner as the SCRs, i.e., to turn on well after zero current phase during the soft start interval and to be conductive throughout each half-cycle during normal operation, which manner of power transistor control is believed subject to question in that a power transistor cannot be turned on when there is substantial instantaneous load without danger of burn-out.

Another known circuit variation involving use of SCRs to reduce instantaneous start-up load is exemplified by Wright U.S. Pat. No. 3,307,093, disclosing induction motor starting circuitry involving an in-line SCR with bilateral diode bridge circuit, the mode of SCR control in this instance being the customary technique of turning on the SCR well after zero current phase, the firing angle disclosed in this patent being typically about 90°.

SUMMARY OF THE INVENTION

AC-to-AC power regulation characteristic of the present invention utilizes bi-directional power switch means such as one or more power transistors which are turned on each half-cycle at zero current phase and are turned off at a variable current phase during the half-cycle and independently of current flow in the device. The power regulating switch means operates in series with the line and load and is utilized in conjunction with a diode bridge to be bi-directional.

The principal characteristic of circuits of the present invention is that the in-line power regulating switch means is controlled to be rendered conductive at zero current phase each half-cycle of the line power and then rendered non-conductive at a variable time after zero current phase each half-cycle, in contrast to conventionally used SCRs which are turned on at a variable time after zero current phase and then remain conductive until the end of the current half-cycle. Elimination of the requirement of variable after-zero turn-on for variation of power output eliminates the need for inductive filtering of the output, since light-weight capacitative filtering and the line impedance are sufficient to adequately reduce the rate of change of current in the load to provide acceptable e.m.i. levels.

Since no inductive filtering of the output is necessary, there is precise control of the output voltage of the power regulation circuits of the present invention because the output is non-resonant. Also, the regulation circuit has no surge currents in the output and can drive capacitative loads. In addition, in aircraft applications of the circuit, inverting type miller or like integrating capacitors can be used to control the turn-off time of the power transistors for increased e.m.i. suppression.

One troublesome characteristic of SCRs is that they tend to be turned on by random noise impulse, and once on, will not turn off until the half-cycle is completed. Use of power transistors in the manner of the present invention, wherein the transistors are turned off rather than turned on under instantaneous current load, renders the circuit insensitive to noise.

Another advantage of the use of power transistors for power regulation is that with proper bias the power transistors are inherently current-limiting and therefore can be operated into a short circuit load without damage to the power regulating circuit. In conventional power regulation circuits involving SCRs a shorted load often results in currents greatly in excess of rated current, and destruction or damage of the SCRs and possibly other circuit components.

DESCRIPTION OF THE DRAWINGS

In the accompanying drawings, which serve in conjunction with the following description to more particularly illustrate certain embodiments of the present invention, like legends and like alphabetic and numeric designations refer to like circuits or components.

DESCRIPTION OF THE PREFERRED EMBODIMENTS

Figure 1:
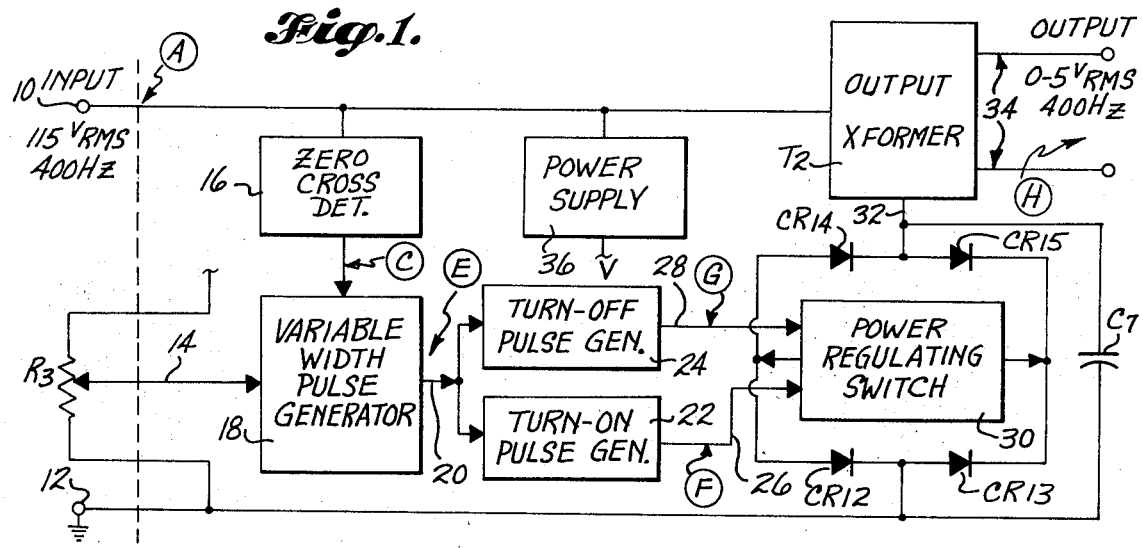
FIG. 1 is a generalized block diagram of a typical application of the present invention to an aircraft lamp dimmer power regulation circuit.
Figure 2:
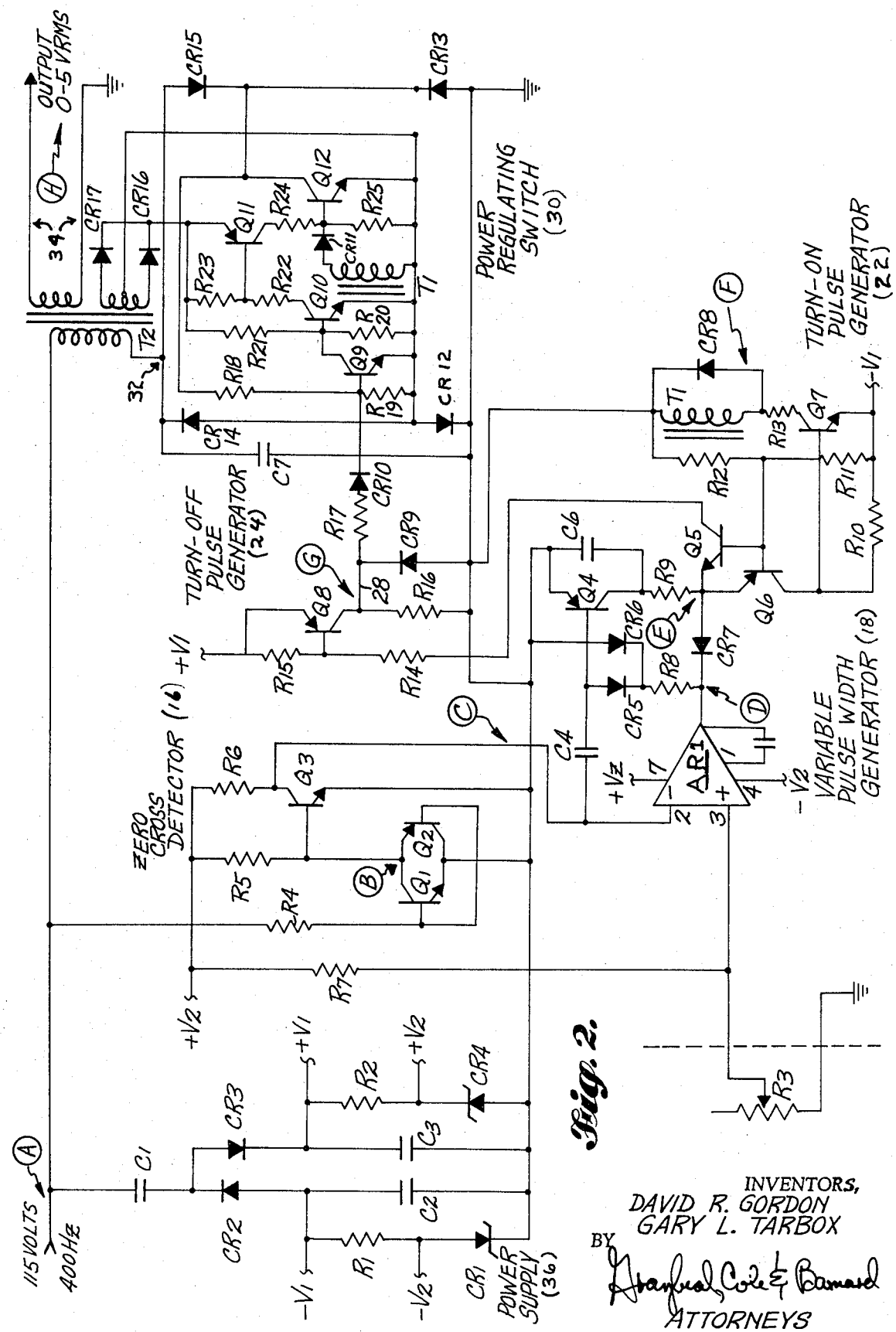
FIG. 2 is a schematic diagram of a lamp dimmer circuit embodying the functional components shown in FIG. 1.

The block diagram of FIG. 1, the schematic diagram of FIG. 2, and the waveforms shown at FIGS. 3A-H collectively illustrate a typical application of the present invention to an aircraft incandescent lamp dimmer power regulation circuit. The following description of this circuit first deals generally with the sub-circuits and circuit components shown in FIG. 1, and then proceeds to a more specific discussion of the circuit as shown schematically in FIG. 2.

Figure 3:
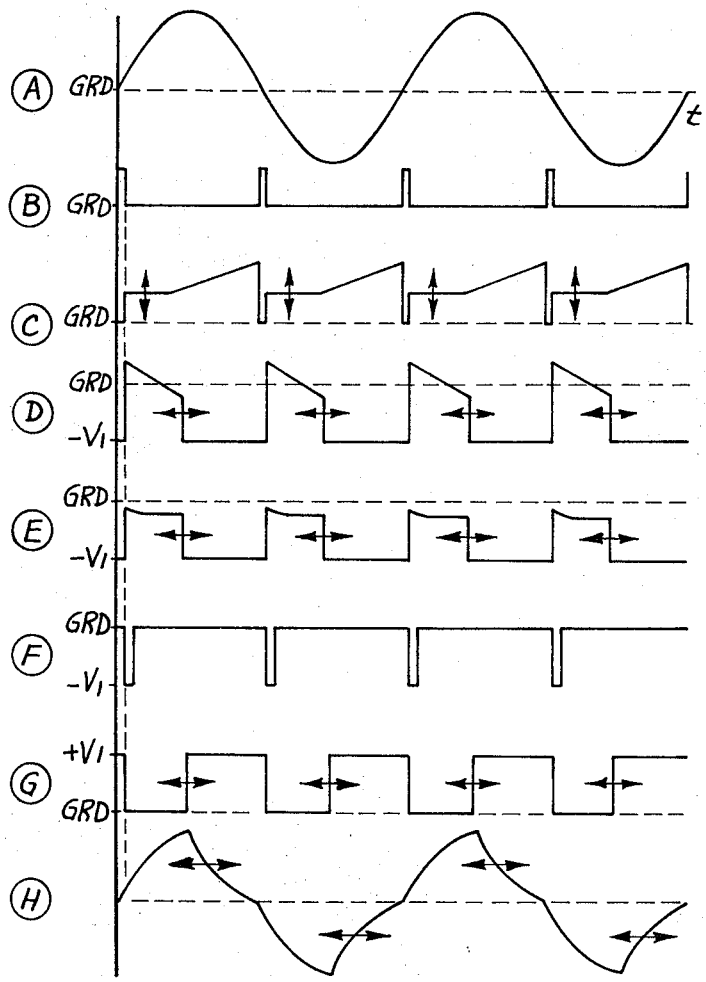
FIGS. 3A-H present idealized waveforms as they appear in various locations in the respective block and schematic diagrams of FIGS. 1 and 2.

The power input applied across ungrounded input terminal 10 and grounded input terminal 12 is typically at 115 volts rms and 400 Hz and is of essentially sinusoidal form, as shown in FIG. 3 at waveform A and so indicated in FIGS. 1 and 2. As will be understood, and as is conventional per se with respect to lamp dimmer power regulation circuits, an externally placed, manually variable potentiometer R3, provides a DC control voltage input 14 to the power regulation circuit, the DC level of which is to control the amount of power output from the circuit, the conventional relation of this DC control voltage input being that of zero regulated power output at zero DC control voltage and maximum power output at maximum DC control voltage.

As shown in FIG. 1, a zero cross detector 16 senses the current phase of the input voltage and, as more fully discussed in connection with FIG. 2, generates internally a pulsed wave (waveform B) which synchronizes the variable pulse width generator 18, with synchronizing pulses being generated at substantially zero current phase each half-cycle, and with the actual shape of the synchronizing waveform applied to the variable pulse width generator 18 being a negative pulse with a lagging edge essentially coinciding with each zero cross of the input current half-cycle (waveform C).

The synchronizing input from zero cross detector 16 is utilized in the variable width pulse generator 18, along with DC control voltage input 14, to develop an output 20 (waveform E) from generator 18, in the form of variable width pulses having a positive going excursion coincident with the lagging edge of the zero cross synchronizing pulses (waveform C), and a negative-going excursion at a variable time after zero cross and determined by the value of the DC control voltage input 14, which negative-going excursion is utilized in the power regulation circuit to turn off the power regulating switch means at the desired conduction angle.

Said variable width pulse generator output 20 (waveform E) is applied as inputs to turn-on pulse generator 22 and turn-off pulse generator 24, which respectively provide turn-on and turn-off control outputs 26, 28 (respectively waveforms F and G) to the power regulating switch means 30. As shown at waveform F, the turn-on control pulse output 26 is a negative pulse of relatively short duration (e.g., 150 microseconds), the negative excursion of which occurs coincident with the lagging edge of the zero cross synchronizing pulse (waveform C). As shown by waveform G, the turn-off control pulse output 28 has a positive excursion at a variable time after zero cross, and remains positive until the time of the next synchronization pulse.

Power regulating switch 30 includes high power transistor means (Q12 in FIG. 2) and associated control circuitry. The high power transistor means Q12 is arranged in a bridge rectifier arrangement of diodes CR12, CR13, CR14, and CR15 to be bi-directional, the output 32 from the bridged switch means being as shown at waveform H. As will be noted in waveform H, the shape of this output waveform follows, each half-cycle, the essentially sinusoidal input waveform from each instance of zero current phase to some after-zero phase.

For purposes of illustration waveform H and the other variable form waveforms are shown in FIG. 3 with power regulating switch turn-off at approximately 90° current phase angle, it being understood that the waveforms will vary in shape depending on the level of the control voltage input 14, as indicated in each of waveforms D, E, G and H by superimposed arrows.

After the initial conduction period each half-cycle, i.e., after power regulating switch turn-off, the output waveform H then decays exponentially toward zero voltage. The rate of this decay, and correspondingly the rate of change of line current, is determined by the line impedance and the capacitative filtering provided by capacitator C7, which is shown in FIG. 1 in parallel connection across the CR12–CR15 bridge, but which can be placed in any other relationship with the line and load to effect the desired line filtering and reduced rate of change of line current characteristic, in a manner known per se.

In lamp dimmer and like applications of AC-to-AC power regulation circuits, design specifications often require the output voltage to be at a different voltage level or range than the input voltage. To illustrate this aspect of the circuit, FIGS. 1 and 2 show the regulated output 32 applied to a line transformer T2, the output 34 from which is at 0–5 volts rms and 400 Hz. However, as will be readily understood, the waveform of the regulated voltage is as shown in waveform H, the only difference in the output as it appears in the primary of the transformer T2 and the secondary thereof being the voltage value.

As will also be understood, the voltage regulation circuit shown in FIGS. 1 and 2 comprises a DC power supply 36 of more or less conventional form per se, which provides the DC voltages necessary for the circuit operation, as indicated generally at V in FIG. 1, and at +V1, +V2, -V1 and -V2 in FIG. 2, with typical DC voltages in FIG. 2 being as follows: +V1, 30 volts; +V2, 12 volts; -V1, -30 volts; and -V2, -12 volts.

Turning to more specific consideration of the circuit shown as schematically in FIG. 2, the line input 10 is capacitatively coupled to the power supply 36 through capacitor C1 and capacitators C2 and C3 via rectifier diodes CR2 and CR3. The resulting rectified DC voltages -V1 and V1 are regulated to reduce ripple by zener diodes CR1 and CR4 and limiting resistors R1 and R2, with respective DC voltages -V2 and +V2 taken off as shown. As generally indicated, typically DC voltages derived from power supply 36 are 30 volts at +V1, 12 volts at +V2, -30 volts at -V1, and -12 volts at -V2.

Zero cross detector 16 is designed to synchronize the variable pulse width generator 18. Transistors Q1, Q2 and Q3 form the active components of this detector. Q1 is saturated during the positive half-cycle of the input line voltage (waveform A), as coupled through resistor R4. Transistor Q2 is saturated during the negative half-cycle of the power line voltage, as also coupled through resistor R4, and when either transistor Q1 or transistor Q2 is saturated, transistor Q3 is non-conductive. Since synchronization is desired when the line voltage is crossing zero volts (i.e., when the line current is of zero phase), transistors Q1 and Q2 collectively detect these occurrences by then simultaneously being in a non-conductive condition. During such occurrences transistor Q3 saturates, with base drive flowing through resistor R5, thus generating the required synchronization pulses for the variable pulse width generator 18.

The variable pulse width generator 18 generates an 800 pulses per second (pps) pulse train (waveform E), with pulse width proportional to the DC control voltage input from control potentiometer R3. The integrated circuit operational amplifier AR1 is operated in both the linear and saturated modes. To simplify the understanding of the variable pulse with generator 18 circuit, the operating modes of the amplifier AR1 are detailed in sequence. Upon saturation of transistor Q3 in the zero cross detector 16, the integrating capacitor C4 discharges and the output (waveform D) of amplifier AR1 goes positive, turning off transistor Q5, and transistor Q4 is saturated by the discharging current of capacitor C6. Then, when transistor Q3 turns off at the end of the zero cross synchronization pulse, the voltage at the negative inverting terminal 2 of the amplifier AR1 steps to the voltage at the positive non-inverting terminal 3 as determined by the voltage divider made up of the resistor R7 and the resistance of the control potentiometer R3. This voltage step is transferred through capacitor C6 to reverse bias the base-to-emitter diode of transistor Q4 and forward biases diode CR5. At this time the amplifier AR1 is operating in its linear mode.

The output of amplifier AR1 ramps negative at a rate determined by the current flowing through resistor R6. When the amplifier AR1 output ramps to slightly negative, diode CR6 clamps the voltage at resistance R8 from going negative and the stabilizing feedback loop of capacitor C6 is therefore open. Amplifier AR1 then immediately switches to negative saturation and remains in this state until the next zero cross synchronization pulse. In summary, the length of time during which amplifier AR1 is operating in the linear mode provides a pulse at the generator output (waveform E) of variable width, which is subsequently utilized to control the length of time the power regulating switch 30 is conductive, and this length of time is controlled as a function of the setting of control potentiometer R3.

The purpose of turn-on pulse generator 22 is to supply the current pulse to the power regulating switch 30 at each zero cross to render the power switch conductive. Transistor Q4 turns on at each occurrence of a zero cross synchronization pulse, discharging capacitor C6. At the end of the zero cross synchronization pulse, capacitor C6 charges with current flowing through resistor R9, transistor Q6, and the base-to-emitter of transistor Q7, causing transistor Q7 to saturate. The saturation of transistor Q7 causes current to flow through limiting resistor R13 and the primary of pulse transformer T1. When capacitor C6 is charged to a value determined by the voltage divider formed by resistor R11 and resistor R12, transistor Q6 is turned off. Transistor Q7 is thus turned off and is held off by base-to-emitter resistor R10. Diode CR8 supplies a low impedance path for the current generated by the collapsing field of pulse transformer T1.

The turn-off pulse generator 24 serves to supply a turn-off control signal to the power regulating switch 30 at the end of the pulse from the pulse width generator 18 (waveform E). Upon the occurrence of the negative-going excursion of the amplifier AR1 output 20, diode CR7 forwardly biases the base-to-emitter of transistor Q5. Current thus flows through resistor R14, causing transistor Q8 to saturate. Since V1 is more positive than the emitter of transistor Q9, current flows through resistor R17 and diode CR10, turning on transistor Q9. At the next zero cross pulse, diode CR7 reverses bias, turning off transistor Q5, and transistor Q8 is held off by resistor R15, the voltage at transistor Q8 collector being held at ground by resistor R16 and diode CR9.

Power regulating switch 30, including high power transistor Q12 and the associated control circuitry, has two basic functions; (1) the switch 30 is turned on during the linear operation of amplifier AR1, thus connecting the primary of line transformer T2 to ground, and (2) the switch 30 is turned off upon completion of the conduction period each half-cycle, functioning when turned off to stop the current flow in the primary of step-down line transformer T2.

The control circuitry associated with the high power transistor Q12 is comprised of low power transistors Q9, Q10 and Q11, and this entire transistor circuit is connected inside a full-wave rectifier bridge formed by diodes CR12, CR13, CR14 and CR15. The base drive for the power switching (i.e., gating) transistor Q12 is derived from a rectifier circuit comprising diodes CR16 and CR17, the output from which is typically 10 volts rms at twice line frequency, with a waveform essentially like the output waveform (waveform H).

Unlike conventional SCR type power regulation circuits, the power regulating transistor Q12 of the present invention is controlled to turn on at zero cross of the line current and to turn off at completion of the desired conduction period (also known as the desired conduction angle) each half-cycle. In the circuit shown at FIG. 2, this is accomplished in the following manner. At the instant of zero current phase of the line voltage, the emitters of transistors Q9, Q10, Q11 and Q12 are at ground potential. The current from the turn-on pulse generator 22 output 26 (waveform F) causes current to flow in the secondary of line transformer T1, thus forwardly biasing diode CR11 and the base-to-emitter of transistor Q12. With transistor Q12 saturated, current flows through the primary of transformer T2. The turn-on pulse (waveform F) is sufficiently wide to allow the voltage to build up and forwardly bias either diode CR16 during the positive half-cycle or diode CR17 during the negative half-cycle. Under these conditions, transistor Q9 is biased off by resistors R18 and R19, and transistor Q10 is saturated with base drive flowing through resistor R21. Transistor Q11 saturates with base drive flowing through resistor R22 and the collector of transistor Q10. With transistor Q11 saturated, base drive for transistor Q12 flows through resistor R24, thus holding transistor Q12 in saturation for the duration of the conduction period.

At the end of the desired conduction period, transistor Q9 is saturated by current flowing from the turn-off pulse generator 24 (output 28, waveform G) through resistor R17 and diode CR10. With transistor Q9 saturated, transistor Q10 is biased off, which removes the base drive from transistor Q11. Transistor Q11 is thus turned off, which removes the base drive from the gating transistor Q12, and when transistor Q12 is biased off, the collector-to-emitter voltage rises, which in turn supplies base drive to transistor Q9 through resistor R18, thus latching the gating transistor Q12 off regardless of any changes in the turn-off pulse generator output 28.

Short circuit protection is inherent in the power switch control circuitry above described. If the gated bridge output 34 is shorted, the collector current of transistor Q12 becomes excessive, in which event the voltage drop across transistor Q12 increases, causing current to flow in resistor R18, which in turn saturates transistor Q9 and turns off the gating transistor Q12 in the manner earlier described.

Conducted electromagnetic interference (e.m.i.) is caused by rapid changes of current in the input or output lines of a power regulator. In the power regulator circuit shown at FIG. 2, for example, e.m.i. can be effectively and simply reduced to an acceptable level by simple capacitance type line filtering. In FIG. 2, the line filtering capacitance is provided by capacitor C7, the operation of which is as follows. Before the gating transistor Q12 turns off, capacitor C7 is discharged. After the gating transistor Q12 turns off, capacitor C7 begins charging at a rate determined by the impedance (normally essentially resistive) of the load and by the capacitance of capacitor C7.

Since capacitor C7 functions to reduce change in current in the primary of transformer T2, both input and output e.m.i. are effectively reduced.

The following lists typical component values in the circuits schematically shown at FIG. 2:

| Component | Description |
| --- | --- |
| Q1 | 2N2483 |
| Q2 | 2N2907 |
| Q3 | 2N2222 |
| Q4 | 2N2907 |
| Q5 | 2N2483 |
| Q6 | 2N2907 |
| Q7 | 2N2222 |
| Q8 | 2N2907 |
| Q9 | 2N2483 |
| Q10 | 2N2222 |
| Q11 | 2N2907 |
| Q12 | MJ1800 |

| Component | Description |
| --- | --- |
| CR1 | IN4742 |
| CR2 | IN4005 |
| CR3 | IN4005 |
| CR4 | IN4742 |
| CR5 | IN4148 |
| CR6 | IN4148 |
| CR7 | IN4148 |
| CR8 | IN4148 |
| CR9 | IN4148 |
| CR10 | IN4148 |
| CR11 | IN4148 |
| CR12 | IN4005 |
| CR13 | IN4005 |
| CR14 | IN4005 |
| CR15 | IN4005 |
| CR16 | IN4148 |
| CR17 | IN4148 |
| CR18 | IN4148 |
| C1 | .22uf 200V |
| C2 | 6.8uf 35V |
| C3 | 6.8uf 35V |
| C4 | .01uf 25V |
| C5 | 33pf 200V |
| C6 | .033uf 100V |
| C7 | .22uf 200V |
| R1 | 1K ohms 1/2W 5% |
| R2 | 820Ω 1/2W 5% |
| R3 | 10K POT 1/2W |
| R4 | 100K 1/4W 5% |
| R5 | 22K 1/8W 5% |
| R6 | 1M 1/8W 5% |
| R7 | 15K 1/8W 5% |
| R8 | 22K 1/8W 5% |
| R9 | 2.2K 1/8W 5% |
| R10 | 10K 1/8W 5% |
| R11 | 15K 1/8W 5% |
| R12 | 15K 1/8W 5% |
| R13 | 220Ω 1/8W 5% |
| R14 | 56Ω 1/8W 5% |
| R15 | 22K 1/8W 5% |
| R16 | 100K 1/8W 5% |
| R17 | 100K 1/8W 5% |
| R18 | 56K 1/2W 5% |
| R19 | 56K 1/8W 5% |
| R20 | 22K 1/8W 5% |
| R21 | 6.8K 1/8 W 5% |
| R22 | 390Ω 1W 5% |
| R23 | 120Ω 1/8W 5% |
| R24 | 50Ω 3W 5% |
| R25 | 120Ω 1/8W 5% |

| Component | Description |
| --- | --- |
| AR1 | LM301A (National Semiconductor Corporation) |
| T1 | G4528-1 (Sage Electronic Corp.) |
| T2 | 80007-12 (Pacific Electro Dynamics, Inc.) |

Figure 4:
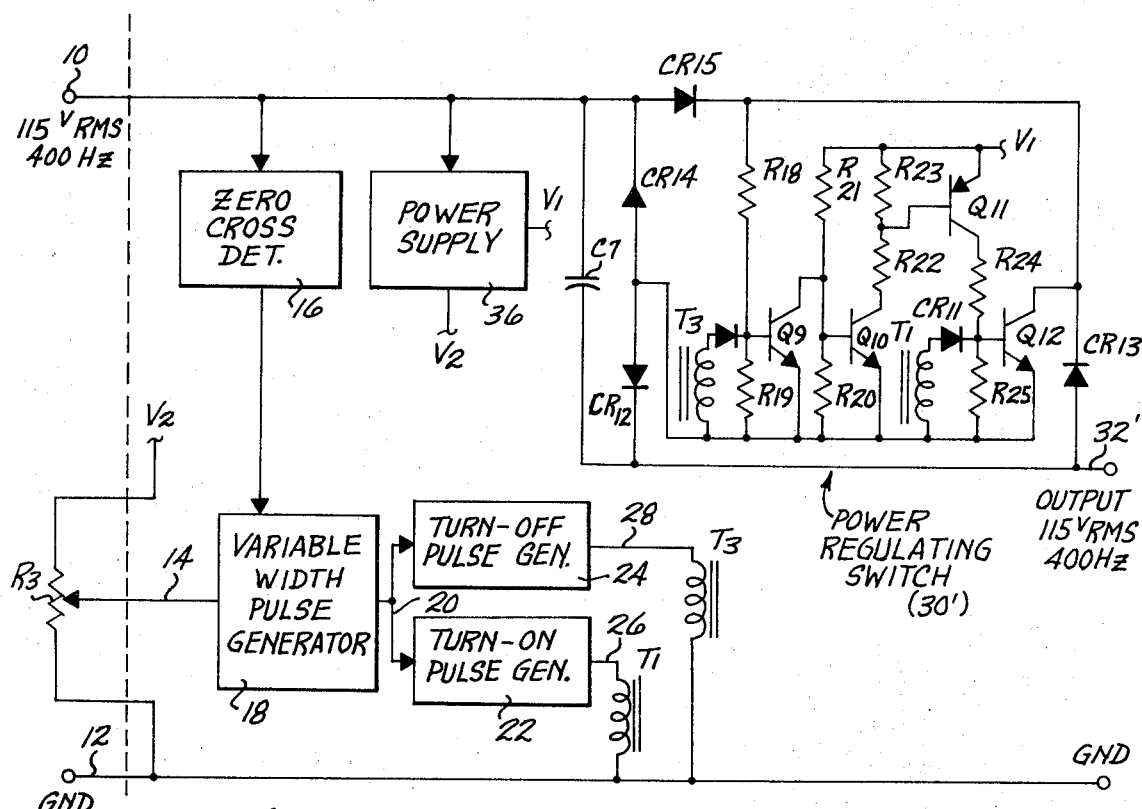
FIG. 4 is a partly diagrammatic, partly schematic presentation of a modified form of power regulating circuit embodying the invention, the circuit in this instance being of the direct couple type, i.e., providing an output at essentially the same voltage as presented at the input.

FIG. 4 illustrates a somewhat modified form of power regulation circuit according to the present invention, designed to produce an output 32' which is directly coupled to and of the same order of voltage as well as frequency as the AC input 10. In FIG. 4, like sub-circuits and components are designated with like designations as used with respect to the corresponding sub-circuits and components found in FIGS. 1 and 2, and the circuit operation will be understood to be the same as that of the earlier discussed circuit. The turn-on pulse generator 22 output 26 is applied to the power regulating switch 30' through pulse transformer T1 and the turn-off generator output 28 is applied to the power regulating switch 30' through pulse transformer T3, with zero phase turn-on and variable turn-off of the high power transistor Q12 occurring responsive to the level of the DC control voltage input 14 to the variable width pulse generator 18 in like manner as in the circuits shown in FIGS. 1 and 2. However, the output 32' in the FIG. 4 circuit is taken directly from the diode bridge rectifier made up of diodes CR12–CR15, the output in this instance being at the same order as voltage (115V r.m.s.) as the voltage applied at the input 10. Line filtering capacitor C7 is connected across diodes CR12 and CR14, i.e., directly between the bridge input and output.

From the foregoing discussion of typical forms and variations of power regulation circuits according to the invention, various further modifications will occur to those skilled in the art to which the invention is addressed. As will be readily understood, plural power switch devices can be arranged to operate in parallel to increase line power capacity, if desired. Also, by way of further example, while the DC input control voltage is shown as derived from a manually settable potentiometer R3, as is common practice with lamp dimmer power regulation circuits, it will be understood that the input control voltage to the variable width pulse generator can be externally derived from any other form of manual control or automatic sensor unit, depending on the particular application of the power regulation circuit, such as an automatic temperature sensing element as commonly used for control of power regulation in power supplies for window heating (one such temperature sensing unit being Westinghouse Model AVK1160, for example), and such as automatic load current or load demand sensing units in the case where power regulation is to be responsive to load current, such as when the load is an AC motor or the like.

What is claimed is:

1. In an AC power line circuit, having a power regulating switch means comprising a power transistor connected across a diode bridge to be conductive bi-directionally in said line circuit, the method of regulating the power output, comprising:
   a. establishing said power transistor in a conductive condition substantially coincident with the occurrence of zero current phase of the line power each half-cycle of the line power;
   b. developing an input control voltage as a function of the regulated power desired for the load;
   c. controlling the base bias of said power transistor in response to said input control voltage to render said power transistor non-conductive at a time during each half-cycle of line power when the phase of the line current is more than zero current phase and a substantial line voltage is across said power regulating switch means; and
   d. capacitatively filtering the power output applied to the load to minimize changing current in the line and load and thereby reduce generation of electromagnetic interference.

2. An AC-to-AC power regulation circuit for use in a line circuit developing from an unregulated AC input a regulated AC output responsive to an externally derived input control voltage indicative of regulated power desired for a load connected to said output, said power regulation circuit comprising:
   a. zero cross detection means generating a synchronizing pulse substantially coincident with each occurrence of zero current phase of the input AC power;

b. variable width pulse generator means developing a pulsed wave output having a voltage excursion each half-cycle of said input AC power which is substantially coincident with each synchronization pulse from said zero cross detection means and a second pulsed wave output having a voltage excursion each half-cycle of said input AC power which is responsive to the level of said input control voltage;

c. power regulating switch means including a power transistor connected to operate bi-directionally in series with said line circuit and the output load;

d. power transistor bias control circuitry responsive to said first and second pulsed wave outputs to render said power transistor conductive each occurrence of the said first voltage excursion and non-conductive each occurrence of the said second voltage excursion; and e. capacitative line filtering means in the line output load circuit acting to minimize change in current in the line and load and thereby reduce generation of electromagnetic interference therein.

3. A power regulation circuit according to claim 2, wherein said power regulating switch means comprises a power transistor and four rectifier diodes connected in bridge circuit with said power transistor and in series with the line.

4. A power regulation circuit according to claim 3, wherein said capacitative line filtering means is connected across the rectifier bridge.

5. A power regulation circuit according to claim 4, wherein the output from the rectifier bridge is coupled to the load through step-down transformer means.

6. A power regulation circuit according to claim 2, wherein the power transistor bias control circuitry includes control transistor means in circuit with said power transistor means to be non-conductive when the control transistor means is conductive and to be conductive when the control transistor is non-conductive, said control transistor means being responsive to said second pulsed wave output to be rendered conductive by the said voltage excursion thereof.

7. A power regulation circuit according to claim 6, wherein said bias control circuitry includes impedance means coupled to the collector means of the power transistor and supplying base bias to saturate a control transistor whenever the collector current of the power transistor is excessive and under such condition rendering the power transistor non-conductive, thereby providing protection for the power regulating circuit in the event of load short circuit.

8. In an AC-to-AC regulated power supply circuit wherein an AC input is interrupted a variable amount each half-cycle to vary the power output in response to a DC control input variable independently of the power input and wherein the power interruption each half-cycle is obtained by power switch means coupled to the load to which the regulated power output is applied; the improvement comprising:

a. turn-on pulse generation means developing a first series of voltage excursions at twice the AC power input frequency, b. turn-off pulse generation means developing a second series of voltage excursions at twice the AC power input frequency and related in phase to the said first series of voltage excursions in a manner determined by said DC control input, c. bridge type power switch means including a power transistor, and power transistor bias control circuitry responsive to the output of said turn-on pulse generation means to render such power transistor means conductive each half-cycle of the AC power input and responsive to the output of said turn-off pulse generation means to render such power transistor means non-conductive each half-cycle of the AC power input.

* * * * *